United States Patent
Hamilton, II et al.

(10) Patent No.: US 7,890,454 B2
(45) Date of Patent: Feb. 15, 2011

(54) METHOD AND SYSTEM FOR DATA DISAGGREGATION

(75) Inventors: Rick A. Hamilton, II, Charlottesville, VA (US); Jenny S. Li, Danbury, CT (US); Vivek Salve, Poughkeepsie, NY (US); Anne R. Sand, Peyton, CO (US); Elisabeth R. Stahl, Shaker Heights, OH (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 12/117,393

(22) Filed: May 8, 2008

(65) Prior Publication Data

US 2009/0281847 A1    Nov. 12, 2009

(51) Int. Cl.
G06F 7/00 (2006.01)
G06F 17/00 (2006.01)
G06F 17/30 (2006.01)

(52) U.S. Cl. .................. 707/609; 707/693; 707/720; 707/755

(58) Field of Classification Search .............. 707/609, 707/693, 694, 720, 721, 755, 812, 825
See application file for complete search history.

(56) References Cited

U.S. PATENT DOCUMENTS

| | | | |
|---|---|---|---|
| 5,313,631 A | 5/1994 | Kao | |
| 6,732,241 B2 * | 5/2004 | Riedel | 711/154 |
| 6,789,115 B1 | 9/2004 | Singer et al. | |
| 7,383,286 B2 * | 6/2008 | Hamanaka et al. | 707/694 |
| 7,594,076 B2 * | 9/2009 | Tsumagari et al. | 711/114 |
| 7,640,409 B1 * | 12/2009 | Stafford et al. | 711/162 |
| 2002/0107871 A1 | 8/2002 | Wyzga et al. | |
| 2002/0161784 A1 | 10/2002 | Tarenskeen | |
| 2005/0125463 A1 | 6/2005 | Joshi et al. | |
| 2005/0251802 A1 | 11/2005 | Bozek et al. | |
| 2005/0268121 A1 | 12/2005 | Rothman et al. | |

(Continued)

FOREIGN PATENT DOCUMENTS

EP    1 215 590 A2    6/2002

OTHER PUBLICATIONS

Bruce Naegal, Greener Computing-Using Software to Create Energy Efficiencies in the Data Center, www.greenercomputing.com, Dec. 14, 2007.

*Primary Examiner*—Don Wong
*Assistant Examiner*—Merilyn P Nguyen
(74) *Attorney, Agent, or Firm*—George R. McGuire; Bond Schoeneck & King, PLLC

(57) ABSTRACT

A method and system for migrating source data from a source database to a destination database based on energy efficiency and conservation. A migration server evaluates the source data for usage and requirements and defines data usage and requirement tags for the source data. The source data is disaggregated into one or more source data sets based on the data usage and requirement tags. The migration server then identifies candidate destinations for the source data, wherein each candidate destination has stored data identified with usage and requirement tags. The data migration server compares the first usage and requirement tags of the source data with the second usage and requirement tags of the stored data and identifies an optimal destination database based on the comparing step. The data migration server migrates the source data to the optimal destination database.

22 Claims, 2 Drawing Sheets

U.S. PATENT DOCUMENTS

| | | |
|---|---|---|
| 2005/0273726 A1 | 12/2005 | Wyzga et al. |
| 2006/0004884 A1 | 1/2006 | Kling et al. |
| 2006/0080371 A1 | 4/2006 | Wong et al. |
| 2006/0167883 A1 | 7/2006 | Boukobza |
| 2006/0235899 A1 | 10/2006 | Tucker |
| 2007/0011209 A1 | 1/2007 | Wietlisbach |
| 2007/0130234 A1 | 6/2007 | Ikegaya et al. |
| 2007/0136392 A1 | 6/2007 | Oh et al. |
| 2007/0150488 A1 | 6/2007 | Barsness et al. |
| 2007/0250838 A1 | 10/2007 | Belady et al. |
| 2009/0150181 A1* | 6/2009 | Gejdos et al. .................. 705/3 |

* cited by examiner

METHOD AND SYSTEM FOR DATA DISAGGREGATION

BACKGROUND OF THE INVENTION

The present invention relates generally to energy efficiency across the data center, and more particularly to the migration of data based on power consumption.

Energy efficiency across the entire data center is becoming a top concern for corporations around the world. This problem requires consideration of all energy efficiency components of the data center, from component levels through server and system levels, and concluding with the complete data center. At the system level, storage devices are an extremely important part of the equation, which needs to be analyzed. Disk systems can require substantial amounts of power to operate and cool, and in many cases, can require more power than the server itself.

Data migration is the process of transferring data between storage types, formats or computer systems. Data migration is usually performed programmatically to achieve an automated migration, freeing up human resources from tedious tasks. It is required when organizations or individuals change computer systems or upgrade to new systems, or when systems merge (such as when the organizations that use them undergo a merger/takeover).

To achieve an effective data migration procedure, data on the old system is mapped to the new system providing a design for data extraction and data loading. The design relates old data formats to the new system's formats and requirements. Programmatic data migration may involve many phases but it minimally includes data extraction where data is read from the old system and data loading where data is written to the new system.

After loading into the new system, results are subjected to data verification to determine that data was accurately translated, is complete, and supports processes in the new system. During verification, there may be a need for a parallel run of both systems to identify areas of disparity and forestall erroneous data loss. Automated and manual data cleansing is commonly performed in migration to improve data quality, eliminate redundant or obsolete information, and match the requirements of the new system. Data migration phases (design, extraction, cleansing, load, verification) for applications of moderate to high complexity are commonly repeated several times before the new system is activated.

Traditional data migration involves business decisions from application owners and IT administrators to predefine a destination database that usually resides physically on another disk for each given source database. Very often, such migration is a one to one relationship where a source database is mapped to a predefined destination database. This migration process is done at a database level that involves no concerns on how data is being used by applications and how it relates to power consumption.

Reference is made to FIG. 1, which illustrates a traditional database migration process 10. Traditional data migration involves moving all the data from one location to another. It is usually a one to one mapping from the source location to the destination location. Database A at 12 is a source database. A migration tool 14 manages the migration of Database A to its destination location 16. Cleansing scripts are applied to the data in Database A and data from Database A is migrated to a destination database 16. The data from Database A must be merged with any existing data on destination database 16. In these prior art methods, the destination database is predefined for each source database, not taking into account the amount of power used in the destination database and other parameters that may affect the storage and retrieval of the data after it is moved.

It is a primary object of the invention to provide a method and system for migrating data based on power conservation. It is another object of the invention to provide a method and system for selecting the destination database based on energy efficiency. It is a further object of the invention to provide a method and system for determining the length of time for realizing cost savings after migration of data has been performed.

SUMMARY OF THE INVENTION

These and other objects and advantages are accomplished by a method for migrating source data from a source database to a destination database based on energy efficiency and conservation. Specifically, in the method of the present invention, a destination database is selected by evaluating a number of candidates for the destination database based on various parameters of the destination databases. In one aspect of the method of the invention, the source data is identified and data usage and requirement tags are defined. The source data is disaggregated into one or more source data sets based on the data usage and requirement tags. In another aspect of the method of the invention, stored data in each of the destination databases is defined by data usage and requirement tags. In yet another aspect of the method of the invention, the data usage and requirement tags of the source data are compared with the data usage and requirement tags of the stored data and the optimal destination database is selected.

In accordance with another embodiment, a system is provided for migrating source data from a source database to a destination database based on energy efficiency and conservation. Specifically, the system of the present invention has one or more source database systems, a plurality of destination database systems, and a data migration server. In one aspect of the system of the invention, the data migration server evaluates the source data for usage and requirements and defines data usage and requirement tags for the source data. The source data is disaggregated into one or more source data sets based on the data usage and requirement tags. In another aspect of the method of the invention, stored data in each of the destination databases is defined by data usage and requirement tags. In another aspect of the system of the invention, the data migration server identifies candidate destinations for the source data, wherein the candidate destinations have stored data defined by usage and requirement tags. In yet another aspect of the system of the invention, the data migration server compares the usage and requirement tags of the source data with the usage and requirement tags of the stored data. In yet a further aspect of the system of the invention, the data migration server identifies an optimal destination database based on the comparing step and migrates the source data to the optimal destination database.

BRIEF DESCRIPTION OF THE DRAWINGS

The present invention will be more fully understood and appreciated by reading the following Detailed Description in conjunction with the accompanying drawings, in which.

DETAILED DESCRIPTION

As will be appreciated, the present invention provides an effective method for reducing energy consumption of certain types of computer systems. In the method and system described herein, the migration of data from its current storage area to another is optional. The data migration process is enhanced by using power consumption as a guiding factor in determining whether the movement of data in the source database to a destination database is optimal for energy conservation. The decision making process of determining where the data should reside is governed by the objective of consuming less power, which ultimately helps to save operational costs.

Figure 1:
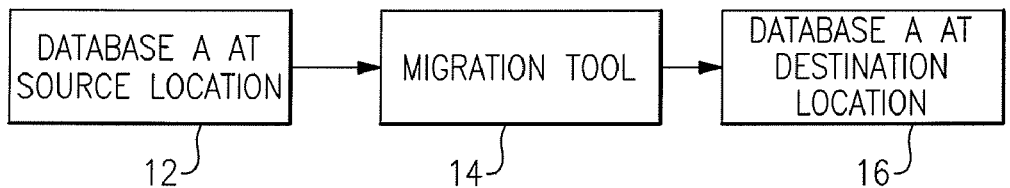
FIG. 1 is a schematic view of a prior art data migration system.
Figure 2:
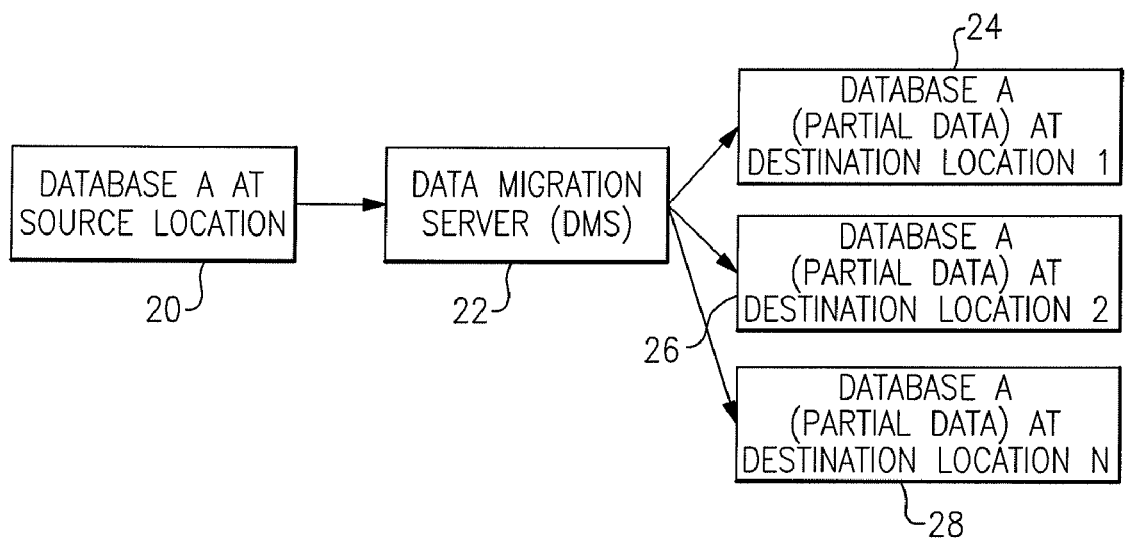
FIG. 2 is a schematic view of the data migration system of the present invention.

Reference is made to FIG. 2, which illustrates the method of the present invention. Database A at 20 is a source database containing data that may be moved to an alternate storage location. Although the focus of the method and system of this invention is directed to data that may be moved, but is not required to be moved, the invention may also be applied to data that must be moved from its current storage location. Migration is ultimately an economic decision that is based on the fixed cost of the migration versus the variable costs for an organization.

Data from Database A is sent to a data migration server (DMS) 22. DMS 22 looks at the data to determine whether moving the data will be cost-effective. The data is broken down into data sets and reviewed by data migration server 22. Each data set is reviewed for migration purposes based on parameters such as frequency of usage, size of data, type of usage, and power consumption, which will be discussed in more detail below. Each data set is then sent to the destination database that is the best "fit" for the dataset. As shown in FIG. 2, a portion of data was sent to location 1 of Destination Database A shown at 24, a portion was sent to location 2 of Destination Database A at 26 and a portion was sent to location N of Destination Database A at 28.

DMS 22 performs many tasks including i) identifying usage and requirements of source data to be moved; ii) identifying candidate target destinations for data migration; iii) performing a match-making data migration decision; and iv) performing data migration, once the destination has been determined.

Figure 3:
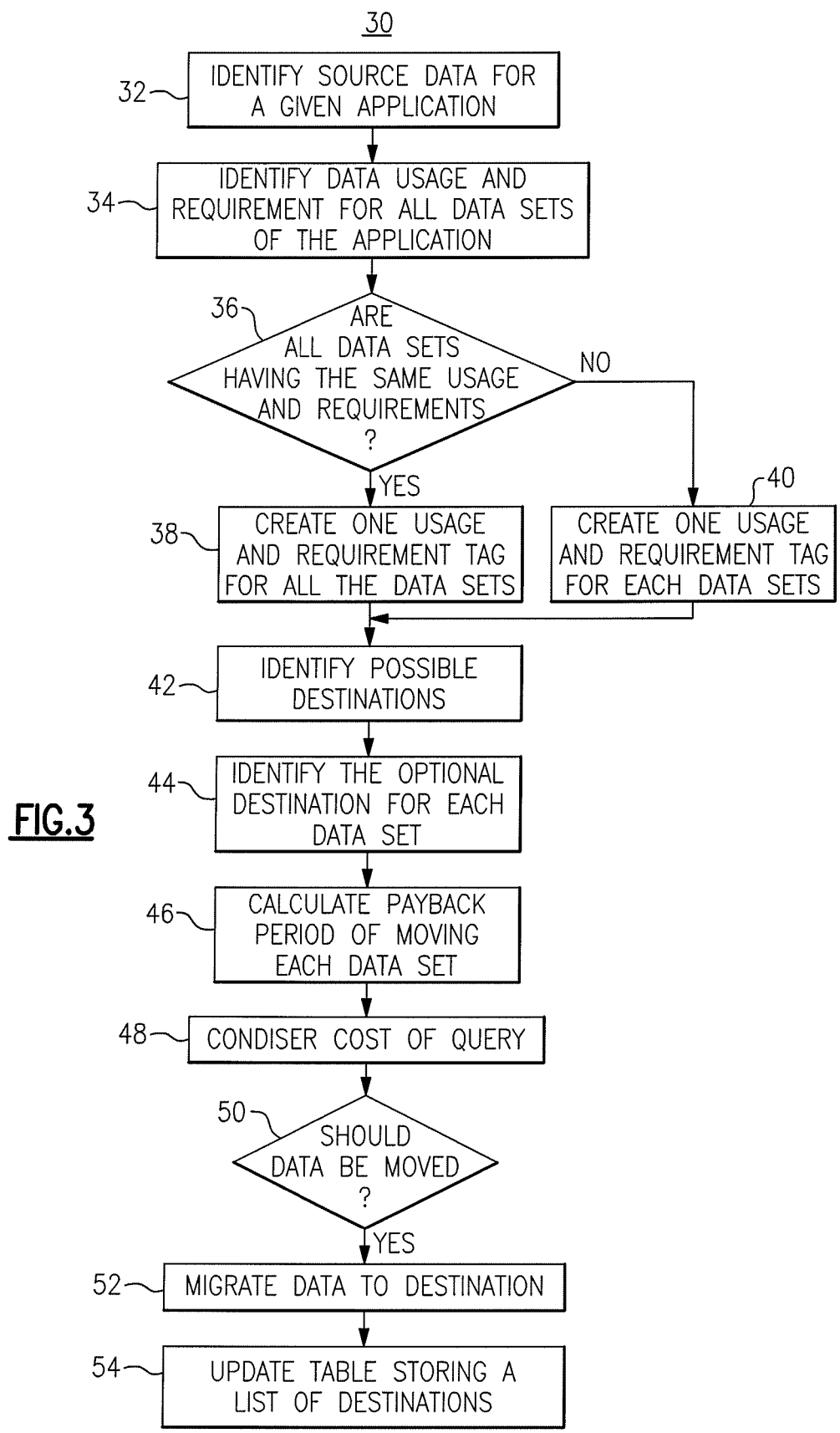
FIG. 3 is a flow chart showing the logic for the data migration system of the present invention.

The specific steps performed in the process will now be described. Reference is made to FIG. 3, which shows the logic 30 of the decision making process performed by the DMS. The goal of the DMS is to reduce power consumption and save energy by determining which source data to move and to which location.

The first step of the process involves the identification of source data for a given application, as shown at 32. Once the data is identified, it must be evaluated for usage and other requirements, as shown in step 34. The frequency of use of the data is evaluated. In order to evaluate usage of the data, time restrictions and usefulness of the data are reviewed, such as the expiration date of the data. For example, after a certain date is reached, the data may no longer be useful or necessary to maintain. Other factors useful in evaluating usage include the expected or acceptable response time for retrieving the data, the geography of the users who access the data, the time of day that users access the data and the number of users who access the data. Based on these requirements, the information is gathered and incorporated into metadata and retained.

The next step, 36, determines whether the data sets have the same usage and requirements. In a database, a data set is a collection of data, usually presented in tabular form. Each column represents a particular variable. Each row corresponds to a given member of the data set in question. It lists values for each of the variables, such as height and weight of an object or values of random numbers. The data set may comprise data for one or more members, corresponding to the number of rows. The metadata created for the data usage and requirement tags can be created for each table or per view to show how data is being used by applications and users.

A data file is a computer file that stores data for use by a computer application or system. For data that resides in files, data usage and requirement tags can be created for each file.

If all the data sets or data files have the same usage and requirements, one tag is created for all the data sets or data files, as shown in step 38. If the data sets or data files have different usage and requirements, separate tags for each data set or file are required as set forth in step 40. The following Table 1 sets forth queries that may be used to determine data usage and requirements tags.

TABLE 1

Usage and Requirement Tags

| | |
|---|---|
| 1. Are there any time restrictions? | (a) Yes<br>(b) No |
| 2. If yes, what is the data expiration date? | (a) Daily (data is being accessed on a daily basis)<br>(b) Weekly (data is being accessed on a weekly basis)<br>(c) Monthly (data is being accessed on a monthly basis)<br>(d) Yearly (data is being accessed on a yearly basis) |
| 3. What is the expected access time? | (a) In seconds (within x amount of seconds)<br>(b) In minutes (within x amount of minutes)<br>(c) In hours (within x amount of hours) |
| 4. What is the location of the majority of the users? | (a) Americas (US, Canada, Mexico, Argentina, etc.)<br>(b) Europe<br>(c) Asia - Pacific North<br>(d) Asia - Pacific South |
| 5. What are the peak hours of access? | (a) Under 100 hours<br>(b) 100-500 hours<br>(c) 1000-5000 hours<br>(d) 5000 or more hours |

When all the queries have been received, data usage and requirement tags are defined for the data set. If the data has different answers to the queries, the data is categorized and different tags are assigned to the different categories.

The following non-limiting example illustrates the invention.

EXAMPLE 1

In this example, a company's Financial Portal application data is being reviewed to determine if it can be migrated for a cost savings benefit. The Portal contains two databases, a user information database that is used for authentication and authorization (DB_UserInfo) and a financial database that contains various financial data of the company (DB_Financial). The DB_UserInfo database is being used daily by about 300 financial users throughout the company, across the country during office hours. It is assumed that the DB_UserInfo database contains only two Tables, Table_UserLoginInfo and Table_AccessControl. A data usage and requirement tag is created for the entire database by the following queries:

1. Time restriction: No
2. Usage frequency: Daily
3. Expected access time: Within x amount of seconds
4. Geography of major users: Americas
5. Peak hours of access: Morning (8 am-6 pm EST)
6. Amount of concurrent users during peak hours of access: 300

The DB_Financial database is being used by users to look up daily managerial tasks, monthly expenses, and quarterly budgets. The views used to generate daily managerial tasks, monthly expenses and quarterly budgets are rendered by the views, VIEW_DailyManagerialTasks, VIEW_MonthlyExpense, and VIEW_QuarterlyBudgets, respectively. Since the data usage and requirements are different for each view a different tag must be created for each view.

For VIEW_DailyManagerialTasks, a data usage and requirement tag may be created by the following queries:
1. Time restriction: Yes, it expires the next day.
2. Usage frequency: Daily
3. Expected access time: Within x amount of seconds
4. Geography of major users: Americas
5. Peak hours of access: Morning (8 am-12 pm EST)
6. Amount of concurrent users during peak hours of access: 100

Similarly, tags for VIEW_MonthlyExpense, and VIEW_QuarterlyBudgets will be created and each data set will be examined separately for potential destination locations.

After the tags have been created for the data sets, candidate destinations are identified, as shown in step 42 in FIG. 3. The DMS will create tables listing potential destination databases along with various parameters, including, but not limited to, location, storage type, space limitations, power consumption, and power output. The DMS will continue to maintain the tables as new information is added or existing data is updated. The following Table 3 is an example of a table created by the DMS listing destination databases along with various parameters.

Once the tables have been created by the DMS, the DMS will determine which destination database is optimal for migration of the data set or sets, based on the usage and requirement tag, as shown in step 44. In this step, the DMS will match the application data used by the application to the more desirable locations. The DMS will evaluate the information in Tables 3 and 4 above to determine the optimal destination for the data sets. The following non-limited examples illustrates this step of the process.

EXAMPLE 2

The Financial Portal in Example 1 above is used in this example. In viewing Tables 3 and 4 above, the tag created for DB_UserInfo in Example 1 above may fit into three destination databases. NAS001 currently stores an email database DB_Mail001 that is used by 2000 users in the United States on a daily basis between 8 am and 6 pm EST. Although the power used per operation is fairly low (425 watts per operation), this location may not be the most desirable for storing DB_UserInfo because DB_UserInfo has 300 users accessing the database within the same time slot from 8 am to 6 pm, and users are expecting the response time to be within a few seconds. NAS003 may be more desirable by comparison.

TABLE 3

Destination Database

| Database | Location | Storage ID | Storage Type | Vendor/Model | Space Available | Power (watt)/operation | Power used so far (kilowatts) | Max. Power consumption limit (e.g. kilowatts per month) |
|---|---|---|---|---|---|---|---|---|
| 1 | Denver | NAS001 | NAS | Net Apps | 1,300 | 425 | 4000 | 10000 |
| 2 | Tokyo | NAS002 | NAS | Net Apps | 2,000 | 300 | 5000 | 10000 |
| 3 | Toronto | NAS003 | NAS | Net Apps | 4,600 | 600 | 7000 | 8000 |
| 4 | San Jose | DASD001 | DASD | XYZ | 4,600 | 600 | 7000 | 8000 |
| 5 | Denver | TAPE001 | Tape | ABC | 3,900 | 760 | 3500 | 6000 |

In addition to the properties of the destination databases, the DMS also evaluates the data that is currently in each destination database based on a set of parameters including, but not limited to amount of users, peak hours of access, usage frequency and geography of the users. The following Table 4 is an example of the a table created and maintained by the DMS, which displays the usage and requirements for the data that is currently in each destination database. The DMS maintains and updates both Tables 3 and 4.

Even though it has an email database that is used by users in the same time slot, the number of users is much less in NAS003 than in NAS001. A third candidate choice is NAS002, since the users in NAS002 access the data from 8 am to 6 pm Japan time, which is about 7 pm to 5 am EST. The server is located in Japan, therefore, the response time may increase for a user accessing from the United States. This may not be desirable Out of the three potential candidates, NAS003 is the best destination for database DB_UserInfo. As

TABLE 4

Usage and Requirements for Currently Stored Data

| Storage | Application ID | Application Name | Database | Geography of Major Users | Usage Frequency | Peak Hours of Access | Amount of Concurrent Users |
|---|---|---|---|---|---|---|---|
| NAS001 | App001 | NotesEmail | DB_Mail001 | US | Daily | 8 am-6 pm EST | 2000 |
| NAS002 | App002 | NotesEmail | DB_Mail002 | AP North | Daily | 8 am-6 pm Japan | 1000 |
| NAS003 | App003 | NotesEmail | DB_Mail003 | Canada | Daily | 8 am-6 pm EST | 500 | long as database DB_UserInfo is added to NAS003 and does not result in exceeding the maximum power consumption limit, specified in the last column in Table 3, then NAS003 can be chosen for the data. However, if it exceeds the maximum power consumption limit, the next best option can be selected.

EXAMPLE 3

In this example, the database DB_Financial of the Financial Portal is evaluated for migration to the best candidate destination database. It has three datasets with different tags. The VIEW_DailyManagerialTasks is accessed daily only during the morning when the managers would like to see any pending tasks that need their approval. The three candidate choices for this dataset are as follows. The first is NAS001, which may not be a good choice since it already has an email database that is used by 2000 users in the same geographic area for the same time slot. The second option is NAS003, which has two applications (an email database and potentially, the Finance Portal's DB_UserInfo) that use the same time slot. The third choice is NAS002 because it will not conflict with the users that are using the email database (DB_Mail002) due to the time slot it is being used (7 pm-5 am EST). Also, the managers in the United States may not be upset if the data retrieval speed is a few seconds longer when they are retrieving tasks that need their approval. Most likely, the NAS002 will be the optimal destination database for the VIEW_DailyManagerialTasks dataset.

Up to this point, step 44 in FIG. 3, the process has demonstrated how the data usage and requirement tag can be used as guidance for dispatching data to the desirable locations, as DMS matches the requirements of the dataset to be moved with the availability of the destination systems. By dispatching data according to the requirements (hours of access, usage frequency, location of users, amount of users and other factors), it is possible to avoid capacity peaks of accessing, overloading, or even overheating the system. This process results in better power consumption, potentially prolonging the life expectancy of the systems involved.

After the determination has been made as to where to move the dataset, the process includes a means to calculate the period of time that will elapse before cost savings are realized from the migration process. This "payback period" is performed at step 46. The payback period may be measured in any predefined measure of time, such as, minutes, hours, days, months or years. For each target destination on the list of potential targets, the payback period, measured in months, is calculated as follows:

$$(T_0+E_0)x=M_i+(T_i+E_i)x$$

$T_0$=estimated cost per month of ownership of the current system;
$E_0$=estimated cost per month of the energy consumption of the current system;
$M_i$=estimated cost of migrating the data to the destination system;
$T_i$=estimated cost per month of ownership of the destination system;
$E_i$=estimated cost per month of the energy consumption of the destination system; and
x=payback period in months.

Since x is the only unknown variable and the remaining variables are known fixed numbers, the variable x that represents the duration of the payback period can be calculated easily.

The following non-limiting examples illustrates the use of the formula.

EXAMPLE 4

Data migration of database DB_UserInfo, an email application database that contains employees' login identifications and passwords, is being considered. This information does not have an expiration date as users log into the system and check email on a daily basis. In this case, as long as the payback period is acceptable to the decision makers, migration will be performed. Using the formula, $$(T_0+E_0)x=M_i+(T_i+E_i)x,$$

where $T_0$=$3,000/month
$E_0$=$2,7000/month
$M_i$=$6,5000/month
$T_i$=$1,9000/month
$E_i$=$1,1000/month ($3,000+$2,700)x=$6,500+($1,900+$1,100)x $5,700x=$6,500+$3,000x 42,700x=$6,500 x=2.4 months

The calculations revealed that the payback period was determined to be 2.4 months, which is a very short amount of time to wait for cost realization to occur.

EXAMPLE 5

In this example, a decision needed to be made as to whether to migrate data for a 2006 fall budget plan. The 2006 fall budget plan was last year's budget. It is time sensitive data. The payback period was calculated to be three years. This means that any type of cost savings would not begin until 2010. It was concluded that the migration of this dataset would not have an effective and profitable outcome, since the data would be obsolete in 2010, and it would not be accessed as frequently as compared to the current year. The decision to maintain the dataset in its current location was made.

Another feature of this process considers the cost of generating queries. This is performed at step 48. Depending on how the data sets used by the application are being assigned, data can be fragmented across multiple target locations. In this case, the cost of generating queries should be considered. If data sets are distributed across multiple locations, a latency period will result when generating a query by performing joins across various data sources. A novel aspect of this process involves the simplification of calculations involved in determining the cost of generating queries.

First, the DMS (or system administrator?) determines whether there are any performance requirements. Each data set is analyzed for performance requirements. For example, the application owner can specify that the authentication of a user of the application should take less than 10 seconds. If a performance requirement exists, then the system administrator can perform an estimated cost of the query. Estimating the cost of the query includes the following tasks.

1. Identify the number of data sets and assigned destinations.
2. Copy a sample of each data set into a staging server. For example, the Financial Portal discussed above has three data sets. It can be put into three separate data bases from one or more staging servers.

3. Perform a query using joins that gather data from the source data sets, and measure the query transmission time.

If the transmission time is within the required performance, then the requirement is still satisfied. However, if the requirement is not satisfied, then there is a trade-off. Energy savings may result in latency of query performance. Also, if the target destinations of these data sets are across multiple geographical locations that are very far apart, (for example, some data is stored in a system in Asia, and some data is stored in a system in North America), the system administrators should be able to estimate a network latency period. This information is then used to help determine whether migration is cost-effective.

The next step 50 in the process determines whether the data should be moved. The decision can be made automatically by the DMS or with human intervention if a trade-off is identified. For example, if the cost of a query is not desirable when data sets are scattered across multiple locations and latency of the query results, the DMS can trigger an alert to a system administrator or application owner for final decision making.

In the next to final step 52, the data is migrated, if desirable. Based on the previous steps, the data will be moved to an optimal location if it is determined that it is cost-effective and feasible. In the final step 54, the DMS will update the table that contains the usage and requirements for the currently stored data target destination list (similar to Table 4 above) with the information regarding the data set that has just been migrated to the respective target database.

Another embodiment of the invention is directed to a medium that is readable by a computer or other device, which includes an executable instruction for initializing data migration. In an aspect, the executable instruction involves the process steps 32-54 shown in FIG. 3, as described in detail above. In various aspects, the executable instruction may be in the form of a database utility application, a script-type program, a compiled program, or other suitable forms known in the art.

The term computer-readable medium as used herein refers to any medium that participates in providing an instruction to a computer processor for execution. Such a medium may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves, such as those generated during radio frequency (RF) and infrared (IR) data communications. Common forms of computer-readable media include, for example, a hard disc, any magnetic medium, a CD-ROM, CDRW, DVD, any other optical medium, optical mark sheets, and any other physical medium with patterns of holes or other optically recognizable indicia, a RAM, a PROM, an EPROM, a FLASH-EPROM, any other memory chip or cartridge, a carrier wave, or any other medium from which a computer can read.

Although the concepts outlined here have been primarily focused on relational database management systems (RDBMS), they may also apply to other types of data including, but not limited to, non-relational data, blocks of computer data, any type of application specific computer file (e.g., spreadsheets, word processing documents), and computer executable files.

The invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended embodiments.

What is claimed is:

1. A method for migrating source data from a source database to a destination database comprising:

identifying source data to be moved from a current database;

evaluating the source data for usage and requirements; defining first data usage and requirement tags for the source data;

disaggregating the source data into one or more source data sets based on the first data usage and requirement tags;

identifying candidate destinations for the one or more source data sets, wherein the candidate destinations comprise stored data having second usage and requirement tags;

comparing the first usage and requirement tags of the one or more source data sets with the second usage and requirement tags of the stored data;

identifying an optimal destination database based on the comparing step and based on energy efficiency;

computing a payback period to determine the length of time as defined by x, measured by a predefined time period, required before savings are realized for migrating the one or more source data sets from the source database to the optimal destination database comprising:

estimating ownership cost per predefined time period of the source database defined as $T_0$;

estimating energy consumption cost per predefined time period of the source database defined as $E_0$;

estimating cost of migrating the one or more source data sets to the optimal destination database defined as $M_i$;

estimating the ownership cost per predefined time period of the optimal destination database $T_i$;

estimating the energy consumption cost per predefined period of the source database $E_i$; whereby $(T_0+E_0) x=M_i+(T_i+E_i)x$; and migrating, using a data migration server, the one or more source data sets to the optimal destination database.

2. The method of claim 1 wherein evaluating source data for usage and requirements comprises:

asking one or more of the following queries comprising: (i) frequency of use of the source data, (ii) time restrictions on the source data, (iii) usefulness of the source data, (iv) response time for retrieving the source data, (v) the geography of users accessing the source data, (vi) the time of day users access the source data, and (vii) the number of users accessing the source data;

receiving answers from the queries; and categorizing the answers received from the queries.

3. The method of claim 2 wherein defining first data usage and requirement tags comprises categorizing the tags based on the answers received from the queries.

4. The method of claim 3 wherein identifying candidate destinations comprises:

listing destination databases and parameters of the destination databases, wherein the parameters comprise one or more of i) location of the destination database; ii) storage type of the destination database; iii) storage identification of the destination database; iv) space available on the destination database; v) power use per operation in the destination database; vi) power used in the destination database; vii) maximum power consumption of the destination database; and viii) evaluation of stored data in the destination database.

5. The method of claim 4 wherein evaluating the stored data comprises:

asking one or more of the following queries comprising: (i) frequency of use of the data, (ii) time restrictions on the data, (iii) usefulness of the data, (iv) response time for retrieving the data, (v) the geography of users accessing the data, (vi) the time of day users access the data, and (vii) number of users accessing the data;

receiving answers from the queries; and categorizing the answers received from the queries.

6. The method of claim 5 wherein the second usage and requirement tags are defined by categorizing the tags based on the answers received from the queries.

7. The method of claim 6 wherein comparing the first usage and requirement tags of the one or more source data sets with second usage and requirement tags of the stored data comprises:

narrowing down candidate destinations by selecting destinations with one or more second usage and requirement tags comprising one or more of (i) a different time of day users access the data than set forth in the first usage and requirement tags; (ii) a different geography of users accessing the data than set forth in the first usage and requirement tags; (iii) a low number of users accessing the data; (iv) a short response time for retrieving data; (v) location of destination database; (vi) storage type of the destination database; (vii) storage identification of the destination database; (viii) space available on the destination database; (ix) power use per operation in the destination database; (x) power used in the destination database; (xi) maximum power consumption of the destination database; and (xii) the type of stored data of the destination database.

8. The method of claim 1 wherein the predefined time period is measured in minutes, hours, days, months or years.

9. The method of claim 8, prior to the step of migrating the one or more source data sets to the optimal destination database, further comprising determining if migrating the one or more source data sets to the optimal destination database will create a delay in accessing the source data from the optimal destination database.

10. The method of claim 9 wherein determining if migrating the one or more source data sets to the optimal destination database will create a delay in accessing the one or more source data sets comprises copying each data set into a staging server, performing a query using joins to gather data from each data set, measuring query transmission time to determine if there is a delay.

11. The method of claim 10 further comprising maintaining the one or more source data sets in current location if the migration is not cost-beneficial.

12. The method of claim 1 further comprising:

creating a table listing candidate destination databases and the second usage and requirement tags for each destination database; and updating the table after one or more source data sets has been moved to the optimal destination database.

13. A system including a processor for migrating source data from one or more source databases to a destination database comprising:

one or more source databases having source data;

a plurality of candidate destination databases;

a data migration server;

whereby the data migration server a) evaluates the source data for usage and requirements; b) defines first data usage and requirement tags for the source data; c) disaggregates the source data into one or more data sets based on the first data usage and requirement tags; d) identifies candidate destinations for the one or more source data sets, wherein the candidate destinations comprise stored data having second usage and requirement tags; e) compares the first usage and requirement tags of the one or more source data sets with the second usage and requirement tags of the stored data; f) identifies an optimal destination database based on the comparing step and based on energy efficiency; g) computes a payback period to determine the length of time as defined by x, measured by a predefined time period, required before savings are realized for migrating the one or more source data sets from the source database to the optimal destination database comprising:

estimating ownership cost per predefined time period of the source database defined as $T_0$;

estimating energy consumption cost per predefined time period of the source database defined as $E_0$;

estimating cost of migrating the one or more source data sets to the optimal destination database defined as $M_i$;

estimating the ownership cost per predefined time period of the optimal destination Database $T_i$;

estimating the energy consumption cost per predefined period of the source database $E_i$; whereby $(T_0+E_0)x=M_i+(T_i+E_i)x$; and h) migrates the one or more source data sets to the optimal destination database.

14. The system of claim 13 wherein the data migration server evaluates source data by one or more of: (i) frequency of use of the source data, (ii) time restrictions on the source data, (iii) usefulness of the source data, (iv) response time for retrieving the source data, (v) the geography of users accessing the source data, (vi) the time of day users access the source data, and (vii) number of users accessing the source data.

15. The system of claim 14 wherein the data migration server identifies candidate destinations by listing destination databases and parameters of the destination databases, wherein the parameters comprise one or more of i) location of the destination database; ii) storage type of the destination database; iii) storage identification of the destination database; iv) space available on the destination database; v) power use per operation in the destination database; vi) power used in the destination database; vii) maximum power consumption of the destination database; and viii) evaluation of stored data in the destination database.

16. The system of claim 15 wherein the data migration server evaluates the stored data by asking one or more of the following queries comprising: (i) frequency of use of the data, (ii) time restrictions on the data, (iii) usefulness of the data, (iv) response time for retrieving the data, (v) the geography of users accessing the data, (vi) the time of day users access the data, and (vii) number of users accessing the data.

17. The system of claim 13 wherein the data migration server determines if migrating the one or more source data sets to the optimal destination database will create a delay in accessing the one or more source data sets from the optimal destination database.

18. The system of claim 17 wherein the data migration server creates a table listing candidate destination databases and the second usage and requirement tags for each destination database and updates the table after the one or more data sets has been moved to the optimal destination database.

19. A computer program product encoded in a computer readable storage medium for instructing a data migration server to migrate source data from a source database to a destination database comprising:
   instructing the data migration server to evaluate the source data by defining a first set of data usage and requirement tags for the source data;
   instructing the data migration server to disaggregate the source data into one or more source data sets based on the first set of data usage and requirement tags;
   instructing the data migration server to identify candidate destinations for the one or more source data sets, wherein the candidate destinations comprise stored data having a second set of usage and requirement tags;
   instructing the data migration server to compare the first set of usage and requirement tags with the second set of usage and requirement tags;
   instructing the data migration server to identify an optimal destination database based on the comparing step and based on energy efficiency;
   instructing the data migration server to compute a payback period to determine the length of time as defined by x, measured by a predefined time period, required before savings are realized for migrating the one or more source data sets from the source database to the optimal destination database comprising:
   estimating ownership cost per predefined time period of the source database defined as $T_O$;
   estimating energy consumption cost per predefined time period of the source database defined as $E_O$;
   estimating cost of migrating the one or more source data sets to the optimal destination database defined as $M_t$;
   estimating the ownership cost per predefined time period of the optimal destination database $T_i$;
   estimating the energy consumption cost per predefined period of the source database $E_i$; whereby $(T_O+E_O)x=M_t+(T_i+E_i)x$; and
   instructing the data migration server to migrate the one or more source data sets to the optimal destination database.

20. The computer program product of claim 19 wherein the predefined time period is measured in minutes, hours, days, months, or years.

21. The computer program product of claim 20 further instructing the data migration server to determine if migrating the one or more source data sets to the optimal destination database will create a delay in accessing the one or more source data sets from the optimal destination database.

22. The computer program product of claim 21 further instructing the data migration server to create a table listing candidate destination databases and the second set of usage and requirement tags for each destination database and to update the table after the one or more data sets has been moved to the optimal destination database.

* * * * *